United States Patent
Nelson et al.

(10) Patent No.: US 6,226,933 B1
(45) Date of Patent: May 8, 2001

(54) APPARATUS AND METHOD FOR ENHANCING THE SURVIVABILITY OF EXPOSED STRUCTURES

(76) Inventors: Robert S. Nelson, 2922 Upshur St., San Diego, CA (US) 92106; Reuven D. Zach, 1039 N. Harper Ave. #8, Los Angeles, CA (US) 90046

( * ) Notice: Subject to any disclaimer, the term of this patent is extended or adjusted under 35 U.S.C. 154(b) by 0 days.

(21) Appl. No.: 09/371,974

(22) Filed: Aug. 10, 1999

(51) Int. Cl.$^7$ .................................................. A01G 13/10
(52) U.S. Cl. .................................. 52/101; 47/23; 43/124
(58) Field of Search ............................. 52/101, 3; 47/23, 47/25; 119/57.9; 43/124, 108; 174/136

(56) References Cited

U.S. PATENT DOCUMENTS

| | | | |
|---|---|---|---|
| 334,743 | * | 1/1886 | Byler ........................................ 52/101 |
| 770,461 | * | 9/1904 | Haggerty ................................. 52/101 |
| 3,362,115 | * | 1/1968 | Nyhus et al. ........................... 52/101 |
| 4,110,944 | * | 9/1978 | Carlson ................................... 52/101 |
| 4,309,072 | * | 1/1982 | Tweeddale ........................ 350/96.23 |
| 4,815,896 | * | 3/1989 | Fox et al. .............................. 405/158 |
| 5,003,734 | * | 4/1991 | Dinsmore ............................... 52/101 |
| 5,060,416 | * | 10/1991 | Rohde ...................................... 47/23 |
| 5,433,029 | * | 7/1995 | Donoho et al. ............................ 43/1 |
| 5,581,935 | * | 12/1996 | Anderson ................................. 47/23 |
| 5,596,834 | * | 1/1997 | Ritter ..................................... 43/124 |
| 5,615,524 | * | 4/1997 | Costa, Sr. ............................... 52/101 |

* cited by examiner

Primary Examiner—Daniel P. Stodola
Assistant Examiner—Curtis A. Cohen
(74) Attorney, Agent, or Firm—Lyon & Lyon LLP

(57) ABSTRACT

A sheath apparatus is described for the protection of exposed structures, in particular cables, poles, pipes, and towers from destructive interactions with external threats, including: various animals (including man), plants, and machines as well as from general environmental hazards. The protective configurable sheath apparatus may be optimized for a specific candidate (type of animal, plant, environmental hazard, machine) or for a range of candidates. A configurable sheath fully or partially encompasses the exposed structure to be protected. The sheath may be attached by a variety of means and is typically designed so that it is removable or upgradable. Thus, the sheath can be employed on a temporary basis or it can be replaced/modified as is needed. This versatile configurable sheath permits customization of commercially-available, mass-produced structures as well as retrofitting of installed structures. Sheath base materials may serve multiple functions. The protective properties of the sheath are not necessarily restricted to deterrents such as spikes, colors, patterns (which are used by snakes, frogs, insects, etc.), agents, etc. Design characteristics may also emphasize reducing or increasing the detectability of the exposed structure and attracting beneficial animals (or plants). Intelligent sheath apparatus incorporate active components and they may incorporate passive components. Intelligent sheath capabilities can be enhanced to handle surveillance applications.

15 Claims, 7 Drawing Sheets

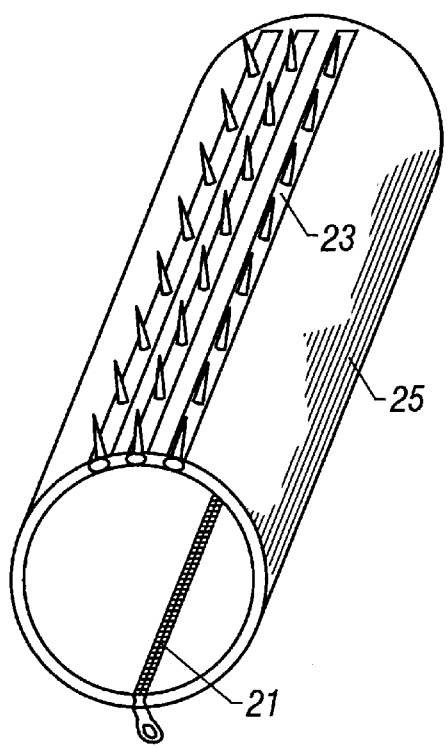
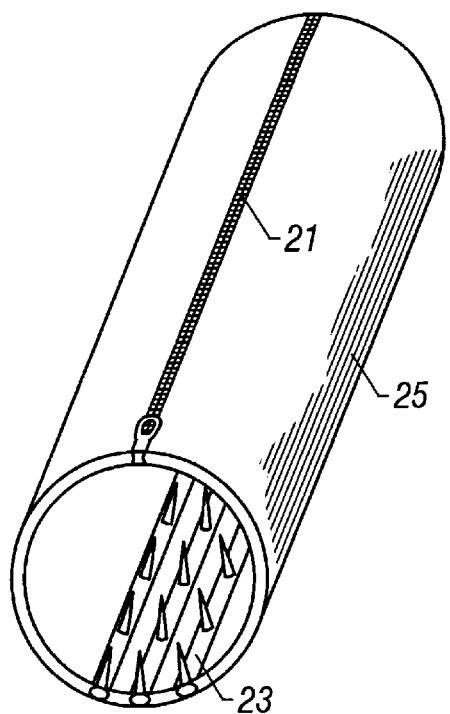
FIG. 2A
FIG. 2B
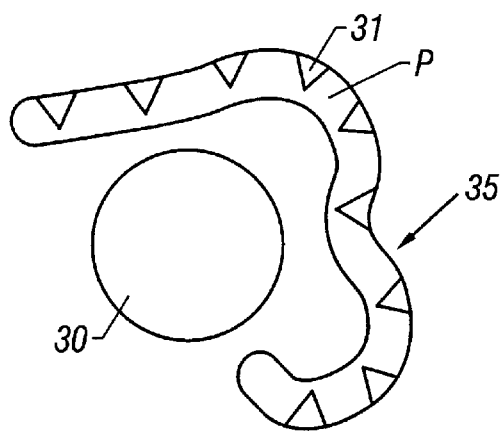
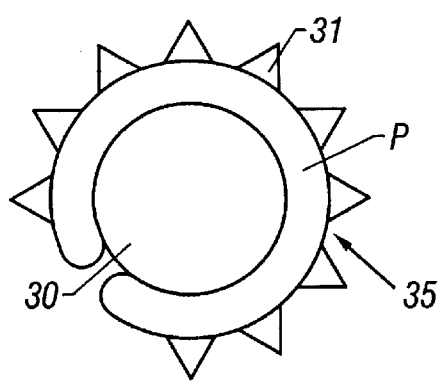
Pressure < Ambient
Pressure > Ambient
FIG. 3A
FIG. 3B

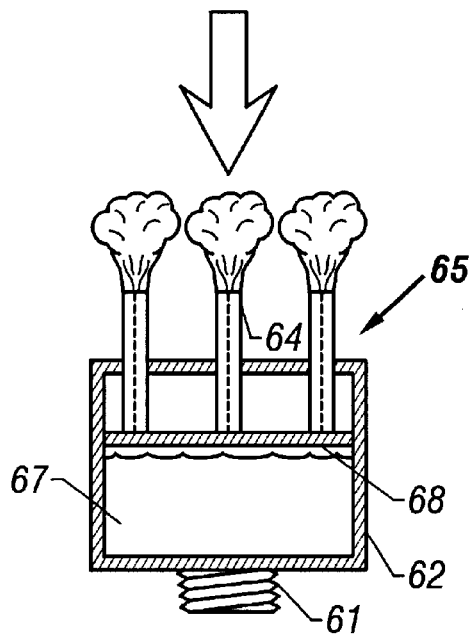
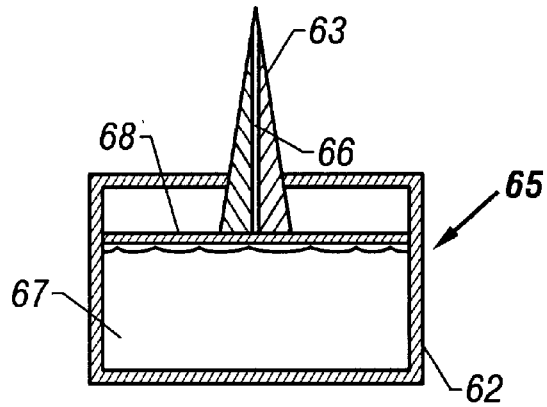
FIG. 6A              FIG. 6B
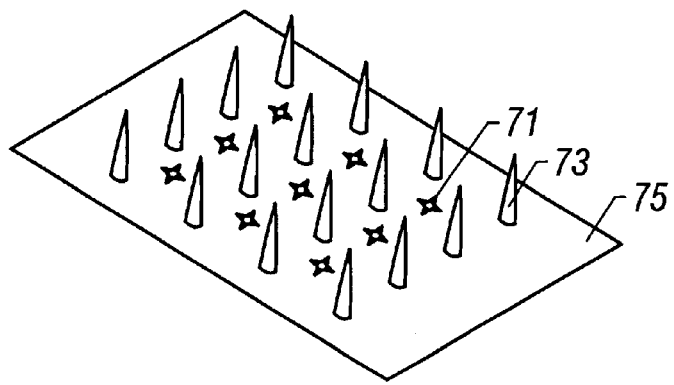
FIG. 7

APPARATUS AND METHOD FOR ENHANCING THE SURVIVABILITY OF EXPOSED STRUCTURES

FIELD OF THE INVENTION

The present invention relates to the protection of exposed structures, in particular cables, poles, and pipes, from destructive encounters with external threats, including: animals (including man), plants, environmental hazards, and machines. In particular, the present invention relates to protective configurable sheaths for exposed structures.

BACKGROUND OF THE INVENTION

The use of tubing or a jacket to manufacture a cable or modify a cable is well-known. The tubing or jacket introduces protective attributes such as weather-resistance, insulation, chemical resistance, fire resistance, abrasion resistance, EMI shielding, etc. which typically require that the tubing or jacket be a continuous covering. Stretchable tubing, heat shrinkable tubing, and jackets with zippers, snaps, or Velcro-like adhesives are commercially available (see "The Zipper Tubing Co." for example). The present invention can be understood by considering the problems encountered while trying to protect exposed structures such as cables, poles, pipes, towers, etc. from attack by animals (and plants). For example, buried cables may be attacked by burrowing animals or animals that dig holes. Underwater cables will often be targeted by fish (including crustaceans) as potential food, as intruders, as building materials, or for refuge. The presence of certain marine biology can in turn attract other species of marine biology, compounding the problem. Suspended cables such as power lines or telephone/cable-TV lines may provide a friendly environment which could encourage plant growth or attract animals such as birds, bats, cats, squirrels, rats, opossums, raccoons, snakes, monkeys, koalas, etc. The presence of plants can add unnecessary weight to, create fire hazards for, attract animals and other plants to, and obscure the location of the exposed structure.

Animals may shorten the useful life of cables by eating, biting, clawing, or rubbing the cable (which might produce catastrophic results or create an opportunity to inflict further damage by other animals, plants, and environmental factors such as moisture, heat, cold, wind); through biochemical means; or by hanging from/sitting on the cables. Thus there is a need for a protective, configurable sheath (also referred to as a configurable sheath or simply as a sheath) which can be attached to new and existing exposed structures, including cables. Various factors such as weight, ease of customization, upgrade, repair, installation, and removal will influence sheath design considerations. Animals may create cavities in trees or poles and animals may climb on trees, poles, towers, pipes, or ducts (as well as into pipes and ducts). These acts may result in the destruction of or loss of functionality of the exposed structure itself (or equipment such as electrical or monitoring devices attached to the exposed structure). Plants such as vines may attach to the exterior (or interior) of an exposed structure, introducing mechanical stress, creating possible fire hazards, and attracting animals (and plants). Small animals may bring building materials and leave waste products in a duct. Existing protective devices such as barbed wire tend to be heavy (since it needs to be self-supporting and is targeted at large animals) and it employs a fixed pattern of barbs (so it is not upgradeable or configurable on-site). Typically, barb wire is used only for containment and is not well suited for preventing interference with an exposed structure. Thus there is a need for a configurable sheath which can be attached to new and existing exposed structures in addition to cables. The protective, configurable sheath design can be customized or tuned for use with a variety of exposed structures (cables, pipes, tubing, ducts, chains, wiring, trees, poles, towers, antennae, fences, vehicles, animals, etc.). The tuning process may involve adding, remove, or modifying passive or active components (features). A sheath which includes one or more embedded or attached active components can be described as a protective intelligent configurable sheath or simply an intelligent sheath. In certain situations the functions of a configurable sheath with passive and/or active components can be provided by the judicious placement of the components on or within the exposed structure. The sheath base material can be omitted. A sheath which includes active and/or passive components but no sheath base can be described as a protective structured configurable sheath or simply a structured sheath.

Exposed structures are often difficult to maintain or protect because these structures are extended in one or more dimensions. Determining how and from where the exposed structure is being threatened (plants, animals, environmental hazards, machines) and initiating an active response (on some level) can be crucial for the long-term viability of the exposed structure. In addition, knowing the magnitude and location of the threat may influence the choice and magnitude of the response. It may be desirable to increase or reduce the visibility of the exposed structure. For example, in many instances hanging cables are difficult to detect by electrical or magnetic means; with ionizing or non-ionizing radiation such as electromagnetic (EM) or acoustic radiation; by the presence of chemical compounds in the air; or by the manner in which they modify the local environment. Hanging cables can create hazards for airborne objects such as planes, helicopters, gliders, birds, bats, etc. and surface-dwelling animals. Buried or underwater cables may be difficult to detect using acoustic, neutron or EM radiation, or by electrical or magnetic means. Poles or antennae may represent flight hazards or obstructions in some situations and targets in other situations. The use of a configurable sheath would be beneficial for these and related applications. Prior devices and methods do not address these concerns.

SUMMARY OF THE INVENTION

The present invention is an apparatus and method which address the problem of protecting exposed structures, in particular cables, poles, ducts, and pipes from direct and indirect threats posed by various animals, plants, environmental hazards, and machines and other external threats. For exposed structures such as ducts and pipes, the exterior and/or the interior of the exposed structure may require protection. A partial listing of exposed structures which can benefit from the use of this invention include cables, poles, ducts, pipes, tubing, chains, wiring, railing, fences, piers, towers, antennae, buildings, vehicles, boats, planes, roofs, gutters, trees, etc. Versions of this invention can be worn by an animal at risk. A protective configurable sheath (also referred to as a configurable sheath or a sheath) can be customized in order to target one or more environmental, animal, and plant problems. Threats posed by machines can also be targeted. A sheath fully or partially encompasses the exposed structure (such. as a cable) to be protected. The sheath can be designed to be permanent, removable, degradable, or upgradable. In one embodiment of the present invention, a sheath for a cable or other like structure is disclosed wherein the sheath may be attached manually or by an automated assembly system before, during, or after cable installation. This permits customization of commercially-available, mass-produced cabling as well as retrofitting of installed cable.

A prefabricated sheath base in sheet, strip, or mesh form may be attached to an exposed structure by mechanical means (an adhesive; a tie, band, a hooks-and-loops system (Velcro-like); a zipper, a clip, a snap, a screw, a mechanical insert; by using heat, chemical, optical, electrical, or acoustic means to seal a seam, etc.). An alternate installation method is to apply the sheath directly to the exposed structure by spraying or pouring a quick-setting base material such as a plastic or rubber to form a continuous sheath base or a non-continuous (structured) sheath base (such as a pattern comprised of dots, strips, grids, etc.). Passive and active components (features) such as spikes, disks, dispensers, sensors, sources (including transmitters and electronic displays), MEMS, electroactive polymeric actuators, etc.) can be embedded in the sheath base or they can be attached to the sheath base at appropriate locations. Yet another implementation of a configurable sheath is a non-continuous (structured) sheath design which utilizes the exposed structure itself to provide the sheath base to which components are attached. Examples of existing exposed structures which could function as a sheath base include a cable jacket, a pole, a duct, a pipe, etc. Thus, in this implementation the configurable sheath is assembled from individual components attached at appropriate locations along the base provided by the exposed structure. A component such as a spike could be mounted mechanically, magnetically, glued, etc. directly to the surface of the exposed structure at designated locations.

A number of configurable sheath properties can be customized. For example, the sheath can be continuous (a sheet, a mesh, a strip) or structured (a set of disks, a pattern of dots, a pattern of strips, a grid pattern). The sheath may be inflatable or capable of motion. The sheath may incorporate passive and active components (devices). The sheath base can have grooves or rails. The types of conventional materials used to make a sheath base are similar to those used to make cable jackets or tubing (plastic, rubber, latex, impregnated cloth, fire retardant, metal foil, wire, adhesives, etc.). The flexibility inherent in the configurable sheath design permits the use of unconventional base materials (such as Lithium-polymers which can be used in thin, flexible polymer batteries) which can serve more than one purpose (such as a power source, an acoustic or EM source, a display source, an electroactive polymeric actuator, a sensor). Configurable sheath designs can exploit the ability of colors and patterns to warn, attract, or conceal. The chemical and physical properties of the sheath base material (including mechanical properties, weight distribution, resistance to environmental degradation, etc.) and the chemical and physical properties of any components (spikes, disks, sensors, sources, dispensers, etc.) which are embedded or attached to the sheath can be can be optimized as needed. For example, spike properties which can be tailored for a specific application include the distribution of spike sizes, shapes, and patterns; rigidity, material composition, mobility, and internal/external framework. Spikes can be integrated into the sheath base or they can be detachable (and thus replaceable). Detachable spikes can be designed to function in a manner similar to plant thorns or burrs or as launchable projectiles.

A spike can dispense an agent, imitating the function of a spine or spicule which provides protection for certain types of fish or sponges. Agents are consumable materials which can possess attractive, repellant, awareness-enhancing, irritating, or disabling/neutralizing properties. The material composition of the spikes (and any agents they dispense) can be formulated so that they are biodegradable. An agent can be also be dispersed by other dispensing mechanisms including atomizers, pressurized sprayers, or squatters; by sublimation or evaporation; or by a mechanical method. Examples of mechanical agent dispersion devices include mechanisms such as food pellet dispensers. Familiar dispersion devices are used in common household products such as pump sprays and pressurized spray cans; solid air fresheners, insect and pest (scent/odor-baited) traps; or poison dispensers and food dispensers. The agent dispersion device can be designed such that it can be armed or disarmed manually or remotely.

The electric, magnetic, EM, and acoustic properties of the configurable sheath base material (and embedded and attached components) may be customized. As explained, the sheath base can incorporate energy-conversion devices such as solar cells and heat converters for power generation as well as energy storage devices such as batteries and capacitors. An alternative is to treat these devices as components and embed or attach them to the sheath base. The sheath may be designed so as to hide an exposed structure such as a cable by reducing the detection cross section of the cable or by reducing the presence of indicators such as nearby animals or plants. Under different conditions the sheath may be designed as to increase the visibility (in general or selectively) of the exposed structure. For example, cable detectability can be affected by utilizing colored paints or phosphorescent, fluorescent or reflective paint in appropriate patterns; holographs, gratings, and other devices which reflect, scatter, conduct, absorb, or convert incident radiation; materials with energy-dependent radiation attenuation cross sections; LED's, laser diodes, and other EM transmitters; piezo-electric vibrators and other transducers, physical structures to create sound, etc.). Intelligent configurable sheath designs can incorporate active features (with or without passive features) such as the ability to communicate with other active components, the sheath base, or external devices; to perform monitoring and self-maintenance; and to react to threats directly. Active components differ from passive components since they are capable of performing controlled actions which depend on events or situations occurring within their surroundings (for example, by acquiring or transmitting data, implementing signal processing, making simple or complex decisions, converting or storing energy, causing physical movement, etc.). The intelligent sheath may also alert an external device (such as a remote processing and response system) to disperse an agent, emit a sound, fire a weapon, transmit a distress signal, etc. An intelligent sheath can employ proactive and reactive techniques in an effort to fine-tune its protective capabilities. Flexible design parameters ensure that the sheath can be tailored to address threats to cables and other exposed structures for a variety of circumstances.

BRIEF DESCRIPTION OF THE DRAWINGS

FIGS. 2(a–b) show an inflatable sheath of the present invention wherein the sheath includes a zipper closure and multiple spike rows installed in integral slide mounts.

FIGS. 3(a–b) show an inflatable sheath apparatus of the present invention wherein the sheath assumes a predetermined configuration upon inflation. FIG. 3a shows the sheath in an uninflated condition wherein a plurality of spike members are inverted within an inflation chamber. FIG. 3b shows the sheath in an inflated state having assumed its predetermined shape about a structure to be protected, wherein the spike members have everted out to perform a deterrent function.

FIGS. 6(a–b) show spike members which function as agent dispersal mechanisms.

FIG. 7 shows an apparatus of the present invention comprising a spike strip.

DETAILED DESCRIPTION OF THE PREFERRED EMBODIMENTS

The present invention is an apparatus and method which address the problem of protecting exposed structures such as cables, pipes, ducts, and poles (as well as other exposed structures including wiring, chains, tubing, railing, towers, antennae, buildings, vehicles, boats, planes, roofs, gutters, trees, etc.) from direct and indirect threats posed by various animals (including man), plants, environmental hazards, and machines. In the case of exposed structures such as pipes and ducts, the exterior and/or the interior of the exposed structure may require protection.

In many instances it is not economically viable for a manufacturer of commercial cabling, beams, poles, railing, pipes, ducts, etc. to customize the product for survivability in unique situations. The customer may not always know where the product will be used or be aware of all possible hazards. Customization by the manufacturer of the commodity or generic product might entail changes in the manner in which the product can be shipped or stored (which might raise the price significantly). For example, enhancements might result in changes to the physical parameters or durability of the product for purposes of shipping. Customization at the factory will not solve the problems faced by exposed structures which are presently installed. Thus, there is a need to be able to retrofit existing exposed structures. A protective configurable sheath apparatus could be used to reduce maintenance and extend the life span of existing and future exposed structures.

Figure 1:
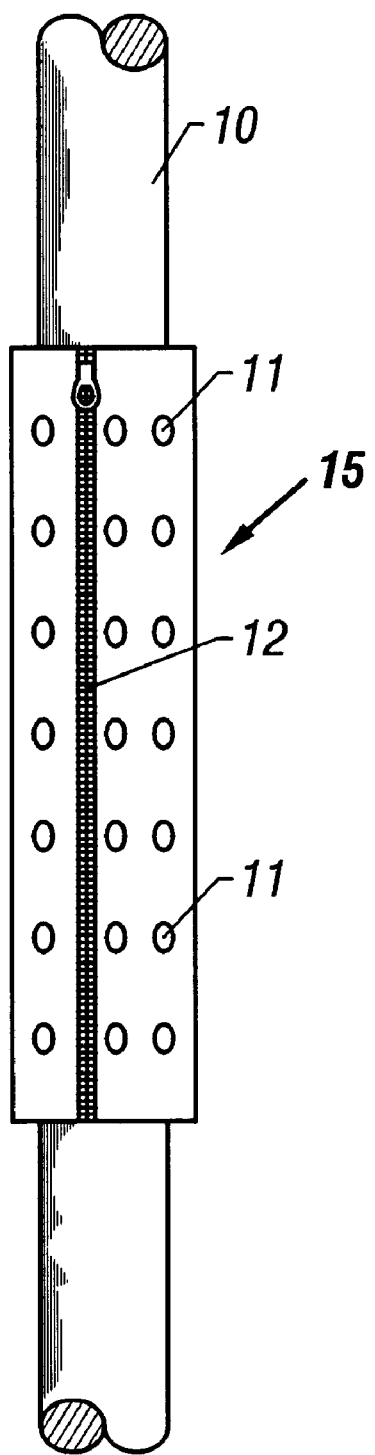
FIG. 1 shows a sheath apparatus of the present invention having a zipper closure disposed about an exposed structure to be protected.
Figure 4A:
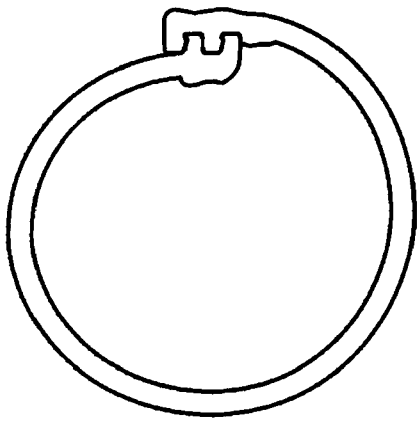
FIGS. 4(a–d) show alternate configurations for closure mechanisms suitable of use with an apparatus of the present invention.
Figure 4B:
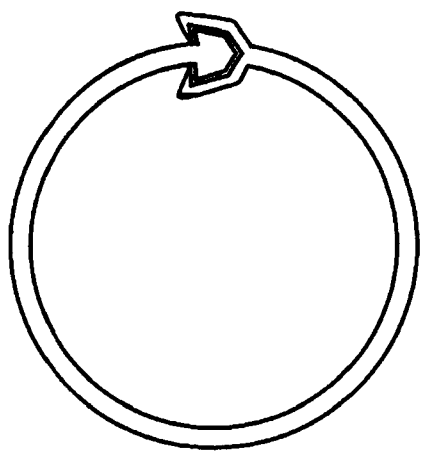
Figure 4C:
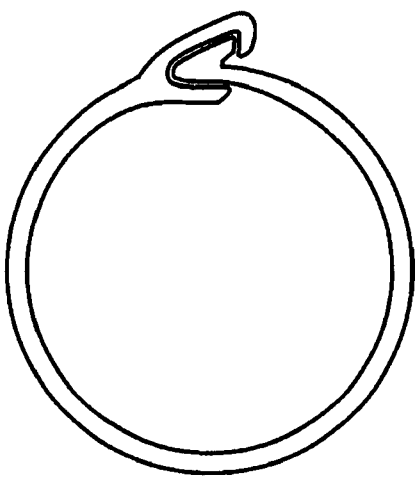
Figure 4D:
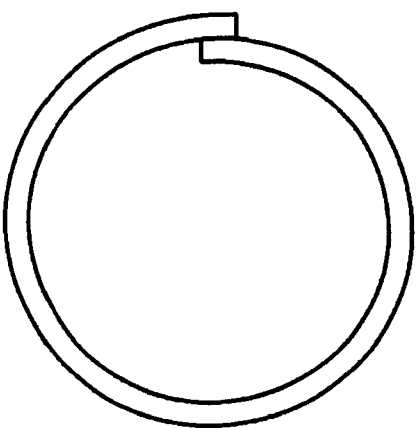

Certain preferred embodiments of the present invention will now be described with specific reference to the appended drawings. FIG. 1 shows one configuration of the present invention comprising a sleeve-like sheath 15 having a zipper closure 12. The sheath 15 includes attachment points 11 which may be configured to receive spikes or devices having specific deterrent functions in accordance with the present invention. The spikes or other deterrent devices may be specifically tailored to the application in order to increase the effectiveness of the sheath 15 at protecting an exposed structure such as a pipe or pole 10.

FIGS. 2(a–b) illustrates another preferred embodiment of the present invention comprising an inflatable sheath 25 having a zipper closure 21. The inflatable quality of the sheath 25 allows the sheath to be installed about structures of various sizes and geometries and allows the apparatus to respond to structures which may have variable sizes due to changes in pressure, temperature, load, etc. The sheath 25 is configured having a plurality of spike strips 23 which are installed along the sheath in grooves in the sheath surface. FIG. 2b shows a configuration wherein the sheath has been inverted which is suitable for storage and/or transportation of the sheath 25. The configuration of FIG. 2b may also be suited for installation on the interior surface of a duct or pipe to protect the inner surfaces from attack from various environmental threats. Overinflation of the sheath 25 would insure that the sheath would remain fixed within the duct or pipe to be protected. Typical inflation materials include gasses, liquids, gels, foams, and coils held under tension.

FIGS. 3a and 3b show an alternate configuration of an inflatable sheath 35 of the present invention wherein inflation of the sheath 35 causes the sheath to assume a predetermined shape suited for the particular structure 30 to be protected. As shown in FIG. 3a, when the sheath 35 is deflated, it may be configured having spike 31 which invert to face inward relative to the sheath surface. Upon inflation, as shown in FIG. 3b, the spikes are configured to evert to face radially outward in order to present a maximum deterrence to environmental threats such as animal interference. The sheath 35 is configured to conform to the outer surface of the structure 30 to be protected when the sheath 35 has been pressurized. In the configuration shown in FIG. 3b, the sheath 35 assumes a tubular shape when inflated which is suited to installation about most structures having a circular or multi-sided cross-sectional configuration, although alternate shapes for the sheath 35 are possible without departing from the teachings of the present invention.

FIGS. 4(a–d) show alternate closure means suitable for use with an apparatus of the present invention which releasably fix an apparatus of the present invention about a structure to be protected.

Figure 5A:
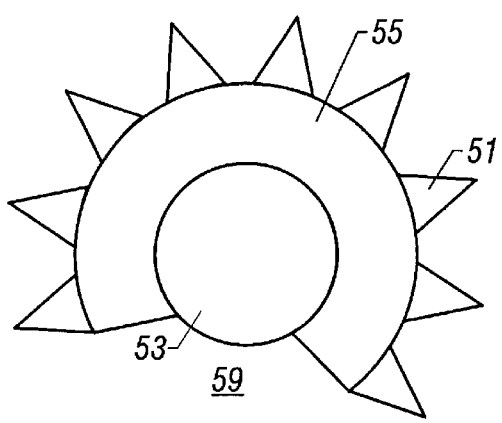
FIGS. 5(a–d) show alternate configurations of an apparatus of the present invention designed to fix the apparatus about an exposed structure to be protected.
Figure 5C:
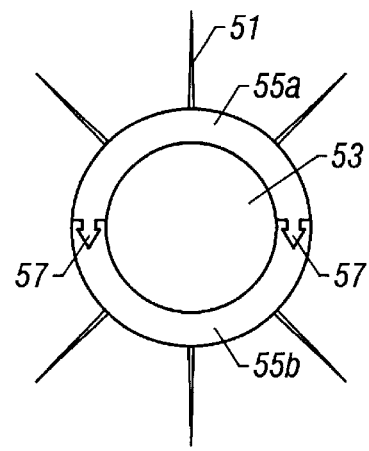
Figure 5D:
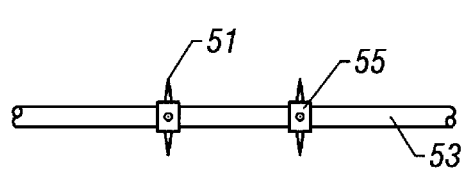

FIGS. 5(a–c) show alternate configurations for an alternative embodiment of the present invention comprising a spiked hub which is configured to be disposed about a structure to be protected as shown in FIG. 5d. FIG. 5a shows one embodiment of the present invention comprising a hub 55 having an open region 59 which is sized to be smaller than the structure 53 to be protected. The hub 55 is configured from resilient material which may be deformed sufficiently to allow the structure 53 to be protected to be passed through the open region 59, the hub 55 then resuming its original shape to maintain itself about the structure 53. The hub may include spikes 51 or other deterrent devices in accordance with the present invention.

Figure 5B:
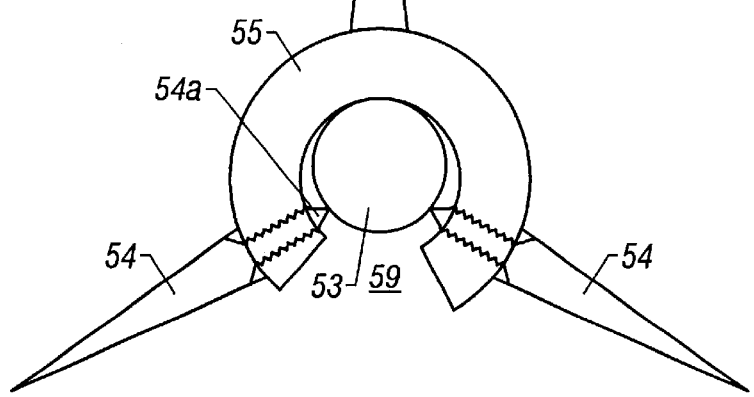

FIG. 5b shows another embodiment of the present invention wherein the hub 55 is substantially rigid and the open region 59 is large enough to accommodate the structure 53 to be protected. Spikes 54 may then function additionally as set-screws for maintaining the structure 53 within the hub 55. A separate set-screw (not shown) may also be used. Other means may be used for maintaining the structure 53 within the hub 55, including spacers, inflatable cuffs, springs, etc.

FIG. 5c shows an alternate configuration of the present invention wherein the hub 55 comprises two cooperating halves 55a and 55b which include an engaging portion 57 for fixing the two halves of the hub 55 about the structure 53 to be protected.

Although the configurations of FIGS. 5(a–c) may be configured having a relatively short longitudinal length as shown in FIG. 5d, the configurations may also be suited for fashioning a long sheath, particularly a sheath which is expected to remain relatively straight without substantial flexion or bending.

The present invention includes alternate configurations of spikes and other deterrent devices or fixtures which are appropriate for protecting an exposed structure from environmental threats. For example, FIG. 6a shows one embodiment of a deterrent fixture 65 comprising a reservoir unit 62 containing a deterrent substance which may be dispersed when activated to drive away, wound or kill animal or plant threats which interfere with the sheath on which the fixture 65 is installed. As shown in FIG. 6a, external pressure applied to nozzles 64 causes plunger 68 to depress which forces the deterrent fluid, gel, mist, powder or gas 68 which is stored in the reservoir unit 62 to be expelled out openings in the ends of the nozzles 64. This deterrent material may be any of a number of irritants, poisons, or other deterrents which are well known in the art. The embodiment shown in FIG. 6a includes a threaded shank 61 suitable for installing the deterrent fixture 65 to an attachment point (see FIG. 1) provided on a sheath, hub, or other device of the present invention. FIG. 6b shows another embodiment of a deterrent fixture of the present invention wherein the dispersion means comprises a spike 63 having a passage 66 for passage of the deterrent material 67. The spike 63 is configured to cause subcutaneous injection of the deterrent material 67 into the animal or plant which contacts the deterrent fixture 65, increasing the effectiveness or potential lethality/deterrent effect of the apparatus.

FIG. 7 illustrates an alternate configuration of a protective apparatus of the present invention for protecting exposed structures from environmental threats. The protective apparatus comprises a sheet 75 including one or more spikes 73 or other deterrent fixtures as described herein. Spike clusters 71 comprising multiple spikes or spikelets may also be fixed to the sheet to increase the effectiveness of the apparatus against smaller sized threats against the structure to be protected. In use, the apparatus of FIG. 7 may be laid over the structure to be protected or may be wrapped about and fixed around a structure to be protected from environmental threats.

Figure 8:
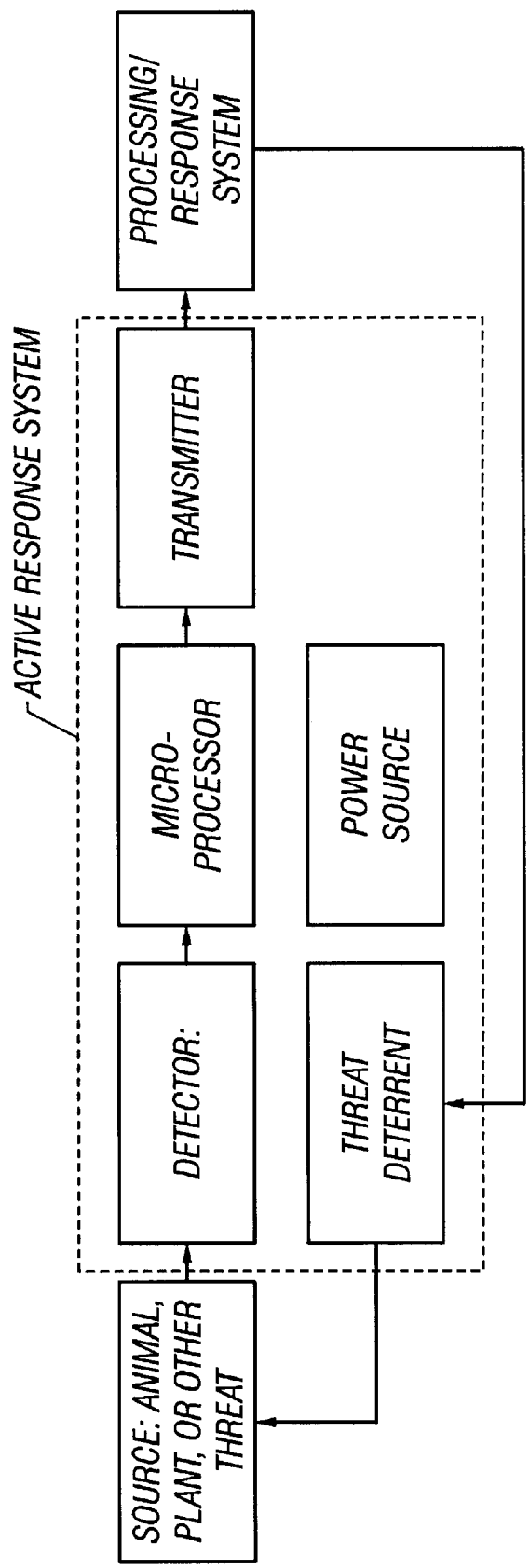
FIG. 8 is a block diagram of an active deterrent response system of the present invention.

The teachings of the present invention include active response systems which detect encroachment or interference of environmental threat and trigger an appropriate response. FIG. 8 shows one possible design on such a system. In this system, a threat source encroaching on a protected structure is detected by a detector proximate the structure. Possible detectors may include camera units, motion detectors, pressure sensors, thermal sensors, noise sensors, tactile sensors, radar sensors, magnetometers, electrometers, radiation sensors, biosensors, spectrometers, or other detection means well known in the art. Information on the detected threat source is processed and communicated to the processing and response system via a transmitter. The processing and response system would then determine an appropriate response and order the threat deterrent fixture to execute that response. For example, the threat deterrent fixture could disperse a repellant chemical as described above, emit an electrical shock or irritating sound or vibration, or burn or otherwise inflict pain on an intruding animal, plant or environmental threat.

The threat deterrent system of FIG. 8 is also suitable for non-living environmental threats. For example, formation of ice may be undesirable on a particular structure. Such formation would then trigger the active response system which would communicate this information to the response system which would process the information and order the threat deterrent to eliminate the ice formation. Elimination could be accomplished by the deterrent fixture by emitting an anti-freeze fluid, heating, vibrating, deflating and inflating, etc.

A method of the present invention comprises installing a deterrent system such as shown and described in FIG. 8 about an exposed structure. The sheath apparatus of a deterrent system includes a detector configured to detect an external threat and collect detection information on the external threat. The detection information could include such information as the location, size, and nature (i.e. man, wild animal, ice, bird, fish, etc.) of the threat. This detection information is then sent from the detector to the processor. The processor receives the detection information and formulates an activation command which is tailored specifically to the detection information received from the detector. This activation command is then sent to the sheath apparatus and used by the sheath apparatus to cause activation of one or more deterrent functions of the sheath apparatus. For example, if the processor receives detection information which indicates that ice is forming on certain exposed locations of a cable, the processor may formulate an activation command which causes the specific section of the cable to vibrate or heat.

The methods of the present invention may be tailored to counter a specific threat. For example, a system for protecting an exposed structure from animal threats may include a detector configured to detect animal presence, such as a thermal detector, a proximity detector, a sound detector, a video monitoring device, a vibration detector, or a motion detector. Detection of an animal's presence would then trigger a specific response from the sheath apparatus, such as a piercing siren, electrification, vibration, or other response designed to inflict irritation, pain or fear on the animal intruder.

Figure 9:
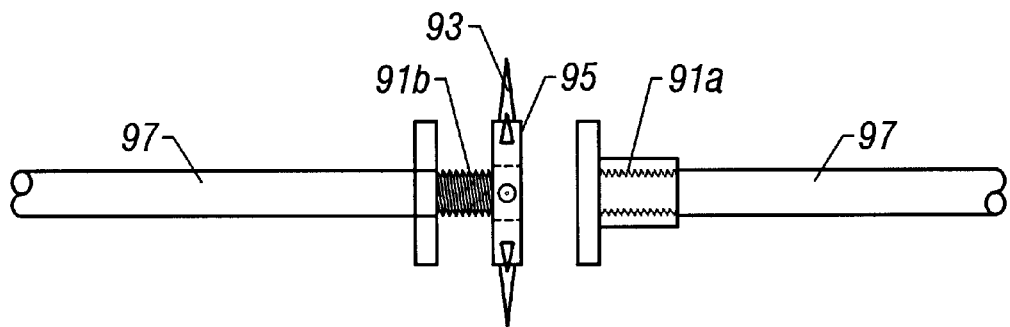
FIG. 9 shows one configuration of a protective hub apparatus which is integrated into the construction of the structure to be protected.

FIG. 9 shows another configuration of the present invention wherein a hub 95 having deterrent fixtures such as spikes 93 is integrated into the assembly of the structure 97 to be protected. The hub 95 of FIG. 9 includes a hole through which a threaded end 91b of the structure 97 is passed and threaded into a corresponding threaded shank 91a on a separate piece of the structure 97 to be protected.

Figure 10:
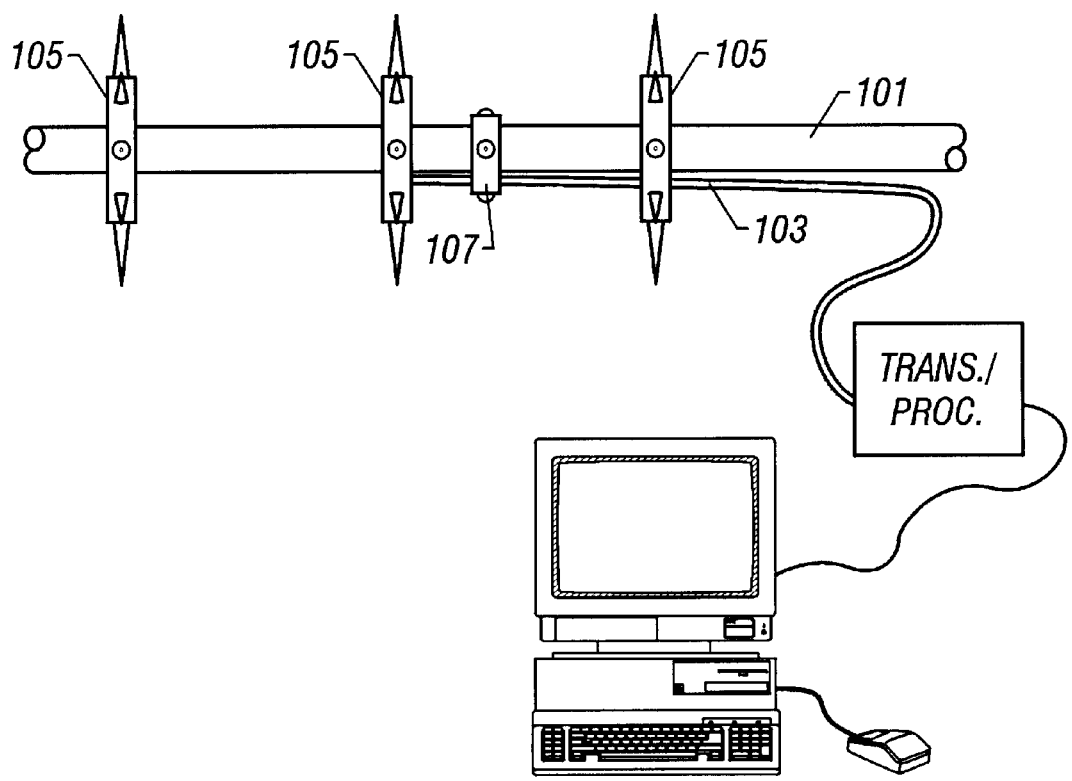
FIG. 10 shows one configuration of an active deterrent response system such as is illustrated in FIG. 8.

FIG. 10 shows an apparatus such as shown in FIG. 9 or otherwise in accordance with the teachings of the present invention wherein the apparatus includes an active response system such as described above in connection with FIG. 8. The apparatus includes one or more hubs 105 which may include detectors for detecting the presence of an environmental threat or a separate detector 107 as previously described may be used. A response system such as a computer would then order an appropriate response from the hubs 105 in order to eliminate or drive away the environmental threat.

The protective configurable sheath apparatus can be attached manually or by an automated system. Automated systems and manual tools are currently used to manufacture cables. (See, for example, the "ZIPPER TUBING CO." product line. ZIPPER TUBING, 13000 S. Broadway, Los Angeles, Calif. 90061. For example, a cable which is being laid on land or at sea would pass through an automated device which involve sealing a seam using heat, chemical, electrical, optical, or ultrasonic bonding techniques, pulling a zipper, applying an adhesive, mechanically fastening the sheath, spraying or pouring a base sheath material onto the cable, etc. If the sheath has the form of a strip or tape it can be wrapped around the cable or attached along the length of the cable. The same automated system or a similar system might attach active components such as pressure, temperature, electric, magnetic, acoustic, EM, or biological sensors (including micro-electromechanical systems (MEMS) implementations), electroactive polymeric actuators, retractable spikes, sources, dispensers for agents, microprocessors, transmitter and receiver electronics (including wireless integrated microsensors), source displays which can manipulate colors and patterns, power sources and converters, etc. Passive components which can be attached to the sheath include spikes, disks, LED's, sound devices, special coatings (color combinations and patterns), etc. If the cable is already installed, a device could spray or attach a sheath as it crawls along the cable. Similar automated crawling devices could be used to attach a sheath to a phone line, a power line, a rail, a pole, the interior or exterior of a pipe or duct, etc. Automated crawling devices for pipe and cable inspection and automated bonding equipment are presently in commercial use. Manual methods of attachment can also be utilized. A sheath apparatus can be comprised of a single sheath or multiple sheaths (sheath modules) whose proximity to each other is application-dependent. If multiple sheath modules are utilized they need not be identical. A sheath can be created by directly attaching components such as sources (including transmitters), pressure sensing pads, temperature sensors, EM sensors, microphones, sensors systems (including MEMS implementations), spikes, disks, etc. to the cable (exposed structure) in predefined locations. In this instance the cable itself takes the place of the sheath base material.

The protective configurable sheath apparatus can be tuned in order to target a specific type of animal (plant, environmental hazard, machine) or a range of animal (plant, environmental hazard, machine) types. A partial listing of applications will demonstrate the utility of a configurable sheath. Marine life may attack an underwater cable for territorial or food-related reasons. Burrowing animals may damage a buried pipe, cable, or a structural support. Birds and other animals may try to peck, gnaw, scratch, rub, grip, or simply rest on a hanging cable, a railing, an antenna, a pole, or a tower. In addition to the effects caused by teeth, claws, and weight, the building of nests and the inevitable presence of waste products tends to be destructive. The presence of an animal may also attract other undesirable animals and plants. Plants such as vines may grow on exposed structures such as poles, towers, and cables. Adverse effects can include introducing mechanical stresses, creating potential fire hazards, attracting undesirable animals (and plants), and obscuring the visibility of the exposed structure. In some cases the exposed structure is difficult to locate, making it a hazard for birds, bats, airplanes, gliders, and helicopters (in the case of power lines or phone lines) or making it expensive to service (in the case of buried pipes or cables). In other instances, it is desirable to make the exposed structure hard to find directly (using ionizing radiation; non-ionizing radiation such as visual, infrared, radar, or acoustic; or chemical means of detection) or indirectly (due to the presence of plants, animals, their by-products, etc.). For example, sea birds will rest on floating objects such as antenna. It should be recognized that the animals or plants which pose a threat to an exposed structure may not be directly responsible for damaging the structure. The presence of a particular plant or animal may attract other plants and/or animals which are harmful to the exposed structure.

The specific implementation of a configurable sheath could take into account potential threats which arise as a result of presence of the sheath. For example a configurable sheath which prevents predator or territorial birds from perching on a hanging cable must not encourage an animal such as a squirrel to treat the modified hanging cable as a safe haven (assuming the presence of the squirrel is considered detrimental). Reducing or eliminating the presence of one plant or animal (or machine) may result in promoting the presence of another potential threat. A specific sheath implementation might be configured with the goal of promoting the presence of a plant or animal for protection, for cleaning, or as a means to alter the local environment. This is why a sheath design which utilizes components can be beneficial in some situations. The sheath can be modified in order to adapt to the environment as is needed (since the environment could be adapting to the presence of the sheath).

Consider the situation in which a sheath fully or partially encompasses an exposed cable. The sheath may be attached to the cable by a variety of methods, including spraying a material such as a plastic or rubber onto the cable in order to form a continuous or non-continuous (structured) sheath base or by mechanical means (adhesive; ties, bands, a hook-and-loop system such as VELCRO™, zippers, screws, clips, snaps, a mechanical insert; heat, chemical, electrical, ultrasonic sealing of material, a pressure differential, etc.). A particular embodiment of the present invention is to use a sheath with a base made from a material which shrinks when heat is applied, similar in concept to heat-shrink tubing used in electronics. The sheath base material can be applied using manual or automated methods. Although conventional cable jacket or tubing materials can be used as sheath base materials, multiple-purpose materials may also be employed. For example, flexible polymers are being used to manufacture batteries. Flexible solar cell materials have been developed. A sheath base which incorporates both of these materials could convert and store energy. Electroactive polymer materials could be employed to give the sheath base motion capabilities. Flexible transducer materials such as PVDF can be used to make the sheath base into a detector or a source (or both). Flexible, optical-emitting polymers (under electrical or mechanical stimulation) can be utilized. The sheath can be implemented in a modular design such that individual sheath modules can be permanent, removable, degradable, or upgradable. The configurable sheath may be applied manually or by an automated system before, during, or after cable installation. This permits customization of commercially-available, volume-production cable prior to installation as well as retrofitting of installed cable.

A number of configurable sheath attributes can be specified such as the continuity of the sheath base, what defines the sheath base, the use of active or passive components, the physical and chemical properties of the sheath base and components, the ability of the sheath base or components to change shape or move, and the use of agents. The sheath base can be continuous (such as a sheet, a mesh, a strip) or structured (dot, strip, or grid patterns, a pattern of spikes and/or disks). The sheath base material can be attached to the exposed structure or the exposed structure itself can serve as the sheath base. The sheath base may be capable of delivering an agent, changing shape, or movement. Active and passive components can be embedded in or attached to the sheath base. A partial listing of active components includes: sensors (pressure, temperature, electric, magnetic, EM, acoustic, biological) and sources (EM, acoustic, transmitters); computer processors; MEMS; the use of active color and pattern such as optical emitting polymers, pixilated thin film, LCD's, micro-mirrors, gases, etc.); electroactive polymer materials, inflatable devices, disks, and slide mounts; mobile and retractable spikes, spikes with internal/external frameworks, dispensers, etc. A partial listing of passive components includes simple and complex spikes, disks, slide mounts, sound sources, LEDS, etc. The chemical and physical properties of the sheath materials and components (electrical, magnetic, EM, acoustic, weight, color, elasticity, chemical resistance, toxicity, etc.) can be optimized for a specific situation. Agents can be selected on the basis of attractive, repulsive, awareness-enhancing, irritating, disabling, or neutralizing properties. Implementations of the configurable sheath apparatus can be employed with the objective of reducing or increasing the detectability (hiding or highlighting) an exposed structure such as a cable. In some applications it may be desirable to incorporate both types of capabilities. Components which may be used to alter the detectability of a cable include: colored, phosphorescent, fluorescent or reflective paints in appropriate patterns; holographic or grating devices; materials which reflect, scatter, conduct, absorb, or convert incident radiation; materials with energy-dependent radiation cross sections; LED's, laser diodes, and other EM transmitters; sound sources including transducers and mechanical devices such as whistles, bells, etc. may be incorporated into the design of the sheath. If the sheath base is an electronic display or the sheath has an attached electronic display component, then updated images, warnings, and status reports could be viewed directly. (The uses for this component are not limited to protective applications. Clearly this display capability can also be exploited for commercial advertising purposes in appropriate situations.) The flexible design parameters ensure that the sheath design can be tailored to address threats to a cable or other exposed structures in a variety of environments.

Spikes used with a sheath can possess a range of properties including a variety of shape and material compositions, tailored elasticity, and both internal and external frameworks. Capabilities can include the ability to deliver electrical shocks and attractive, repulsive, awareness-enhancing, irritating or disabling agents in a controlled manner or in reaction to stimulation. Examples of agents include (but are not limited to): insect and animal pheromones or growth regulators (such as hydroprene), animal scents and musk (including skunk musk), food odors or food, oleo resin capsicum (used in pepper sprays), noxious chemicals (such as ammonia), herbicides, diuretics, anticoagulants, poisons, neurotoxins (such as pyrenone), drugs, reproductive inhibitors, bacteria, viruses, parasite eggs, diatomaceous earth, radioisotopes, tracking dyes, etc. Spikes can be replenished or recharged if an agent is delivered by a dispenser mechanism or a shock is delivered by an electrical power source which can be incorporated into the sheath or the spike mount. This is an alternative to replacement or recharging during automated or manual inspection. Spikes can be retractable, tiltable, and rotatable. Spike motion can be powered by mechanical means (hydraulics or compressed air, levers) due to the weight, bite, or grip of an animal; by electrical means (such as an electrical motor, an electroactive polymeric actuator, etc.) from a power source such as a battery or a solar cell or commercial electricity; by wind or moving water; by expansion of a liquid, gas, or bimetal due to temperature effects, etc. The spike can be permanently armed or armed as needed.

Specific implementations of spikes may generate EM signals (by embedding a source into the spike or using the spike itself as an antenna), acoustic signals (by embedding an acoustic radiator into the spike or by causing the entire spike to vibrate), electric fields, or magnetic fields. The choice of spike materials may be based in part on desired electric, magnetic, and acoustic properties in addition to typical physical traits such as weight, rigidity, etc. A number of spike sizes, shapes, and colors can be used and the spikes can be arranged in patterns. Spikes motion capabilities can cover the range from no motion at all to completely mobile. For instance, the spike could be retractable or rotated (or tilted) within its mount, it could be part of a cluster which can rotate about its mount point, it could be attached to a rotatable disk which forms part of the sheath system, it could be detached by physical contact or it could be launched from the sheath. Spikes can be directly integrated into the sheath or they can be attached to the sheath. Methods of attaching spikes can include bonding, gluing, tape, hooks-and-loops, staples, bands, threaded mounts, snaps, screws, magnetic mounts, quick-release mounts, tension mounts, or by using a pressure differential. If the sheath base contains grooves (channels) then individual spikes (with matching mounts) can be inserted in a groove. If a number of spikes are attached to a slide mount such as a strip, wire, or tube then the slide mount (strip, wire, or tube) can be inserted into the groove (see FIGS. 2a and 2b). The ability to mount a number of spikes at the same time should reduce installation, transportation, and maintenance costs. The ability to mount a number of connected spikes allows for efficient monitoring, power distribution, and distribution of agents to all connected spikes. This technique can be used with other components (such as sources, detectors, dispersion devices, etc.) and is not limited to spikes. The slide mount can incorporate materials such as solar cells and Lithium polymers. Motion capabilities are now available at a low cost since one or more simple actuators (piezo-electric, electroactive polymeric, electromagnets, passive temperature-dependent liquids, gases, and bimetallic springs, cables, screws, hydraulics, etc.) can push and pull the slide mount along the groove or cause the slide mount to rotate within the groove. Translation distances for individual components can be increased if two or more grooves are connected (for example, in a racetrack geometry). In addition to creating effects such as moving spikes or moving patterns and colors, the views of individual detectors can be modified. In some instances repair/upgrade of one or more components is simplified since the slide mount can be withdrawn from its groove. A variation on the idea of using a sheath with grooves along with a slide mount is to reverse the roles of the groove and the slide. In this implementation the rail or track extends from the sheath base and the slide (now called a carrier) is grooved (this is similar to the design of an optical bench/rail with sliding carriers for positioning optical components). Although the actuators described can be used for translation purposes, an alternative is to drive a threaded screw or a rack and pinion mechanism. Optical rails, optical carriers, threaded screw and rack and pinion drive mechanisms can be readily found in optical instruments catalogues such as are printed by Melles Griot, Edmund Scientific, etc.

Although a spike may release an agent directly, it may also release smaller spikes (spikeletts) or micro-spheres which encapsulate the agent to be delivered. Thus, a spikelett or micro-sphere can serve a function which is similar to that of spicules which are released from certain sponges. A spike delivering an agent serves a function which is similar to the poisonous spines of certain fish. An implementation of a configurable sheath which is based on the defensive sponge example is to attach a foam component impregnated with spikeletts or micro-spheres to a sheath base or directly to an exposed structure. Yet another implementation is to have the sponge material function as the sheath base material. Spikes and any agents they dispense can be designed to have a limited lifetime. Although a spike represents a convenient device for delivering a variety of agents, components such as dispensers and other devices (such as perforated tubes or pads, atomizers or pressurized sprayers, squatters, "ink jet" printer heads, foams (sponges), or solid materials which evaporate or sublimate) can be used. These delivery devices can possess varying degrees of mobility. Devices (components) can be embedded or attached to the sheath base which can deliver electric shocks, produce sounds, EM radiation, etc. An alternative implementation is to provide deterrents using a remote processing and response system which is alerted when an intruder alerts the remote system by an action such as touching a spike or pressure sensor pad (of known location) mounted on the sheath. A specific application is protecting a submerged cable from attacks by marine life. A sheath would be used to protect the cable from fish (including crustaceans) of various sizes. FIG. 7 shows a sheath strip with a pattern of needle-like spikes 73 of different sizes, intended to ward off both large and small fish. Interspersed with individual spikes are spike clusters 71 which may have a spherical or semispherical shape. A spike cluster can be stationary or it may possess rotational capability. These spikes and spike clusters can be mounted on a sheath strip which is then attached to the cable. Spikes can be mounted directly using adhesive, heat, chemical bonding, etc.; or by mechanical means such as insertion into a hole, snap on, hooks-and-loops, screwing into a threaded hole, insertion into a mount made from a material which softens, shrinks, or expands when heated or cooled or which swells when treated with a specific material (for example, alcohol); by attaching to a disk, etc. Alternatively, the spikes 73 or spike clusters 71 can be fabricated as part of a sheath. The mount which holds a spike can be rigid or it can permit motion such as allowing a spike to tilt or rotate within the mount. The sheath may be attached to the cable before or after spikes are mounted on the sheath. A number of properties such as spike colors and patterns, shapes, materials, weight, elasticity, mobility, coatings, internal and external frameworks, etc. may be varied so that the sheath is appropriate for the intended application. A simple variant of the configurable sheath design involves attaching spikes directly to the cable (the exposed structure) in a dotted grid pattern using a glue or a simple tension mount.

A spike can be in the shape of a needle, a blade, or a barb and a spike can have an internal and/or external framework such as shown in FIGS. 6a and 6b. An internal framework permits the spike to incorporate new functions such as motion and the delivery of agents. The spike can be retractable, rotatable, or tiltable, providing a degree of control over factors such as directionality and accessibility. FIG. 6b shows a spike 63 which functions like a syringe. It may incorporate a deterrent chemical agent as well as an optional foam which fills the spike reservoir 62. The foam can help control the amount of agent dispensed per incident and provide a restoring force after compression. An internal framework enables the incorporation of components such as a delivery system, a sensor, an emitter, or a means to alter the detectability or identification of a cable (exposed structure) segment. For example, a disk and/or a spike or a pattern of disks and/or spikes made from appropriate materials and/or with voids would modify the apparent acoustic properties of the corresponding section of a cable. The void can be filled with an agent or an absorptive foam and an agent if desired.

Magnetic, electric, and EM properties can also be controlled. A spike may be designed to deliver a shock or an unpleasant (or pleasant, incapacitating, etc.) agent depending on the desire to attract, repel, irritate, enhance awareness, disable, or neutralize (control) certain types of animals and plants for protective or detection/concealment purposes. For example, a magnetic or electric field could be generated in order to attract or repel marine life. Spikes can be designed to be released or launched in order to inflict discomfort or for tracking (monitoring) purposes. A launchable spike represents another example of a component which is capable of motion. This launch capability can be beneficial in and out of the water. Examples include spike-like bullets or darts propelled by a compressed gas or an explosion, an induction coil, and spring-loaded projectiles (similar to rubber tipped darts used with children's toy dart guns). A spike (or other projectiles) can also be flung (released) from a powered rotating disk (wheel) or an electroactive polymeric actuator (See Motion Control Tech Briefs, February 1999, p.7b–8b) of appropriate shape (such as a strip or coil). In some cases projectiles (such as seeds, eggs, fungi, bacteria, virus) may be designed to alter the surroundings.

In FIGS. 5(*a–d*) several sheath component designs comprising circular hubs 55 are shown which can be assembled to form a non-continuous configurable sheath (a structured sheath). The extended disks may be useful in situations where long spikes might have a short life span and/or the internal framework of the extended disk can be utilized. For example, the internal framework can be employed to store items such as agents, power supplies, sources, receivers; to function as a chamber in which devices can expand and contract and thus initiate motion and affect properties such as weight or detectability. One example of the present invention comprises an expanding bladder which increases the acoustic cross section by displacing water or the EM cross section because the bladder surface has a reflective coating. Incorporated into the disk framework are one or more spike, spike clusters, or other repelling devices. One disadvantage of an extended disk is that it may be difficult to bury the attached section of cable. If this represents a problem then a half disk (one of the two halves of a full disk) can be attached to cable. Spikes of various shapes, including needle-like members, curved blades, barbs, or clusters thereof mounted on a disk or cylinder may be particularly suited for application with various embodiments of the present invention. A disk with a single blade is an example of one particular implementation. If the disk blade is segmented or serrated then its appearance resembles that of a toothed gear. A disk can be attached to the sheath base or directly to the cable (exposed structure). The disk can be designed as an immobile component or as a component with rotational capability. For example, a rotating disk having spikes, emitting sounds, dispersing agents, launching projectiles, etc. (whether self-powered, driven by natural forces, or from physical contact), can pose a formidable deterrent to animals and plants. A disk may be pre-assembled, wherein it can be threaded onto the cable while the cable is being installed. Alternatively, the disk can be assembled about the cable during or after installation. If there is a need for the same disk design to be used with cables of different diameters or a cable with a non-uniform diameter then a compressible or inflatable gasket can be attached to the inside rim of the disk hub. FIG. 9 shows the case where a hub 95 which permits rotation is assembled from sections of the structure 97 to be protected. These designs may be useful in dissuading marine life from attacking or attaching to the cable or a bird from landing on the cable. FIG. 5c shows an extended disk shape (a circular cylinder) in two sections which can be connected by snapping the sections together. This makes for efficient manual or automated assembly of such disks about installed cable or new cable. A circular cylinder shape can be modified into other desirable geometric shapes such as a square cylinder, a triangular cylinder, etc. The disk or cylinder material can also be rigid or flexible depending on the desired application. A simple example of a protective sheath of the present invention is a series of disks with appropriate spacing attached directly to an exposed structure. This structured (non-continuous) sheath (in this instance a series of disks) can be attached to a cable as it is strung or deployed from a vessel after it has been installed. An active component which could be used with or as an alternative to a disk and which is capable of motion is a powered electroactive polymeric actuator (with or without attached components such as spikes, agent dispensers, LED's, etc.) in the shape of a strip, a coil, or a more complex shape (such as a pair of wings, a bird, a snake, etc.). If the disk or cylinder material is relatively air tight (or liquid-tight) and flexible (Such as a silicon latex or rubber), then the shape of the disk or cylinder can be modified by inflating or deflating it. The same principle is readily extended such that the shape of the sheath base can be changed by inflating or deflating the base. An inflatable sheath base (see FIG. 3) or component can be useful in situations where shipping costs are lowered due to compactness, where it will be used on or within a variety of exposed structures with differing physical dimensions or a single exposed structure with non-uniform dimensions (that is, it will conform to the geometry and/or scale of the surface, recall how a mounted bike inner tube conforms to both wheel rim and bike tire surface), where there is a desire to change a shape or for motion (inflating/deflating), where there is a desire to unfold a structure (a mirror, a lens, an antenna, a solar cell, an absorber, etc.), where there is a desire to circulate a gas or fluid, where there is a desire to create a buffer, where there is a desire to change detectability, and where flotation properties may be desirable. The degree of inflation can be adjusted as needed. A sheath base might be fully inflated depending on the type of threat. Under some circumstances it might be partially inflated since this would give the impression that the "platform" is unstable. The same principle would be applicable in the case of an inflatable component such as a disk. (In some situations, an alternative to using an inflatable device is to use a similar device filled with compressible foam.) For purposes of reduced maintenance, the inflatable sheath (disk) can be injected with a self-sealing coating or a foam (products readily available for use with bike and auto tires). If at least a region of the inflatable sheath is transparent to EM radiation, lenses or mirrors can be integrated into the inflatable sheath (for example, to focus radiation onto a solar cell or other sensors). Although FIG. 2a shows an encircling inflatable sheath apparatus with at least one inflation chamber which employs a zipper, other implementations are readily apparent. A sheath strip made from a material such as rubber or latex could be wrapped around a cable and then the seam and the ends could be sealed. Another approach is to thread the cable through a sheath tube prior to installation and then seal the tube at both ends as the final step in the process. Yet another variation of this idea is to add a slide mount to the surface of the inflatable sheath shown in FIG. 2a, transforming it into an inflatable component which could then be inserted into a grooved sheath base. The sheath (or component) need not be inflated upon installation. The weight, bite, or grip of an intruder on a pressure pad can provide the limited pumping action needed to fully or partially inflate a sheath module. The natural restorative force of the sheath would cause it to deflate once the intruder disengages from the pressure pad. Again, in certain situations, a compressed foam device might be an acceptable substitute for an inflatable device. One or more configurable sheaths could be employed in the protection of a telephone pole or a tower. A sheath in the form of a simple flat sheet or strip is a preferred embodiment and may be wrapped around a section of a pole or tower. An alternate installation technique is to spray a sheath base material such as a rubber or plastic onto the appropriate section of the pole or tower in a strip, mesh, or dot matrix pattern. FIG. 1 shows a spiked sheath employed to protect a pole and a tower. The sheath base and/or components (such as spikes) may include all of the attributes described previously. The ability to customize the sheath for a particular environment means that a variety of animals (and plants) can be discouraged from accessing (perching, climbing, etc.) these exposed structures or are made vulnerable or expend excessive resources while gaining access. Various machines (such as aircraft, vehicles, ships) could be alerted to the presence of the exposed structure. For applications wherein it is beneficial to have an animal (or plant) present in specific areas only, then the appropriate areas of the exposed structure can be covered as needed. For example, it might be acceptable to permit an animal access to most of a telephone or power pole to eat pests or plants, but not to the hanging cables or electronic equipment. It also might be necessary to keep animals from digging at the foot of a pole. The sheath can incorporate devices in order to disperse agents which may attract, repel, enhance awareness, irritate, incapacitate, or neutralize an intruder, its competitors, or adversaries. Many forms of animal or plant management can be implemented (including over-population or sterilization). A sheath can incorporate alarm devices such as sound and EM sources in order to frighten an intruder or alert its competitors and adversaries (a "dinner bell"). Alarm and agent dispersal devices can be used together. For example, if the intruder is a rat, squirrel, or bird, it might be desirable to attract a coyote, cat, or raptor. If the intruder is a plant, seeding a competitor plant or attracting (or hatching) a particular insect (parasite) could be helpful. Alternatively, a herbivore such as a deer or a cow could be alerted. A sheath can also incorporate components which deliver electric shocks (similar to the principle used in a stun gun, defibrillator, etc.) or vibrate, or are capable of significant movement (due to an inflatable sheath base or component, a rotatable disk, a slide mount, or a powered electroactive polymeric actuator). A vibrating motion or a significant movement may be sufficient to prevent the buildup of snow, ice, and other air-borne materials (environmental hazards) on a hanging cable. Activities such as the dispersion of agents, issuing an acoustic and EM alarms, or mobilizing a maintenance device to clean or repair an exposed structure can be supplied by an external unit such as a remote processing and response system which is networked to the sheath and reacts to alarms issued by the sheath. A configurable sheath, similar to those described for submerged cables, may be installed on the pole or hanging cables. An alternative is to use a sheath with an adhesive backing or ties which are used to secure the sheath after it has been wrapped around the pole or cable. This installation method may also be used for submerged cable. Versions of this invention can be worn by an animal (including man) at risk. For example, cattle or sheep might wear a protective sheath around the neck or legs (or other areas of the body depending on the adversary). Features such as tiltable or retractable (adjustable) spikes may be useful in preventing an animal from harming itself or other non-threatening animals during periods of low risk (a technique utilized by porcupines). The tiltable or retractable spikes can be extended (armed) using a monitoring (sensor) device (an active component) incorporated into the sheath and in contact with the animal or implanted in the animal (in which case it would transmit data to a receiver built into the sheath). A version of this design replaces the conventional sheath base with an inflatable sheath base (or disk). The act of inflating the sheath base (for example, by an attached pressurized (benign or unpleasant) gas cylinder similar to the inflators ($CO_2$ cartridges) carried by cyclists would also elevate the spikes (see FIG. 3b). Both the conventional and inflatable sheaths can be armed with components for dispersing agents. An extension of the idea of a receiver incorporated into the sheath is to incorporate a transmitter and a receiver into the sheath. In this manner animals can establish individual two-way networks with a remote monitoring device. The remote monitoring device could remotely arm or disarm the sheath as needed. The location of the animal can be determined if a GPS receiver component is incorporated into the sheath or if methods such as triangulation or range finding are employed. A less-sophisticated approach involves activating a beacon such as a flashing LED or a beeping speaker. Retractable spike components can also be useful when used to protect exposed structures which are not animals. Retractable spikes can be incorporated into a sheath used to protect a hanging cable such as telephone line. In this case the spike is less-likely to collect debris or introduce unnecessary stress due to environmental hazards such as strong winds or a buildup of ice and snow. A configurable sheath may be designed such that the base and/or components (features) enhance the detectability of the exposed structure for protective or positioning purposes. For buried or submerged cables and pipes, detectability can be increased by embedding acoustic, EM (UV, visible, infrared, radio), electric, magnetic, or thermal sources in the sheath base and/or components. If needed, the sheath may include solar cells, batteries, or utilize commercial electricity to provide power for sheath functions. By increasing the detectability of the exposed structure, the likelihood of a vehicle hitting a pole; a plane, helicopter, glider, balloon, bird, bat, etc. from hitting a tower, pole, or hanging cable; or a crew digging up a buried cable or pipe may be reduced. For example, low power LED's or transmitters (such as are used in a cell phone) could provide an EM warning and broadcast (transmit) the location of the exposed structure. Small transducer elements, speakers, or air horns could generate irritating sounds or sounds which alert opponents of an intruder. Passive techniques can also be utilized, including the use of colored, phosphorescent, fluorescent or reflective paint/tape; the use of directional reflectors; the use of dispersive devices such as gratings or holographic elements; and the use of components that generate sound in an uncontrolled manner such as perforated or vibrating structures, small bells or chimes, etc. Increasing the detectability of an exposed structure via warning mechanisms designed for humans (or machines) might also alter the local environment. This may have the effect of creating a short term or long term deterrent to certain animals, depending on how these animals adjust to the presence of the warning system. In another embodiment, the configurable sheath includes one or more active features which can alter the awareness of the sheath (by modifying display patterns, by initiating movement, by dispersing an agent, etc.) such that familiarity does not engender indifference. A sheath with static or predictable properties may not be sufficient for all situations. A configurable sheath of the present invention may possess active components (an intelligent configurable sheath) which might include the ability to communicate, to react to general or specific threats, to reposition or alter the appearance of sheath structures, and to perform self-maintenance. A number of active components have been described. The sheath base can also be active. One example of an active feature which has already been discussed is the use of a bladder inside an extended disk. Another example is the activation of acoustic or EM sources or the delivery of agents in response to an intruder either from a component incorporated into the sheath or a separate remote processing and response system linked to the intelligent sheath. An intruder might be detected through physical contact with a pressure pad or spike, by vibration or noise sensing using a miniature accelerometer or microphone (such as are manufactured, amongst others, by Endevco), or by blocking an EM or acoustic beam (such as are manufactured, amongst others by Hyde Park). By incorporating EM, electric, magnetic, chemical, acoustic, temperature, motion, or pressure sensor units comprised of one or more sensors (including MEMS implementations), electroactive polymeric actuators, microprocessors and appropriate computer algorithms for signal processing and data analysis, the intelligent configurable sheath apparatus is able to identify a general or specific threat. For example, the pressure increase caused by physical contact (due to the weight, bite, or grip of an animal) can be detected by mechanically pushing a lever or compressing a fluid sack (for example) or it can be evaluated by a pressure sensing pad attached to or incorporated into the sheath. The pad contains a small pressure sensing unit with miniature electronics and a transmitter which can send signals to a nearby receiver. Such a unit could be a MEMS device which incorporates one or more sensors, a transmitter, and a battery. Similar devices such as implantable, wireless, telemetric monitors for animal studies (for example, Data Sciences International PhysioTel PA-c20 telemetric monitor) and patient monitoring are commercially available. Linking to a receiver or a remote processing and response system can also be accomplished optically, electrically, acoustically, or through active changes at the pad which disrupt an existing link (similar to the idea of breaking an infrared beam used in an alarm system). A variety of customized responses for a general or particular threat may be incorporated into the sheath or a linked remote processing and response system including broadcasting warnings such as sounds which mimic those of adversaries or attract adversaries or simply frighten the intruder using a local or remote sound source; vibrating; dispersing agents, generating electrical shocks, EM radiation, or heat; implementing motion of sheath and spike elements, for example, by causing a motor-driven disk to rotate, a motor-driven (such as piezo-electric actuator, see the New Focus, Inc. PICOMOTOR™) spike to retract or extend, a motor-driven spike to tilt or rotate to provide a directional defense, or by launching a spike; powering an electroactive polymeric actuator; inflating a sheath base or component, etc. The mechanism for delivering the deterrent may be incorporated into the sheath, a component, or it may be located remotely (off-sheath). Deterrents may be targeted directly at the intruder or at attracting its competitors/adversaries. For example, a dispersed agent which imitates the scent marking of a predator or a noxious odor such as skunk musk could repel an intruder. Other scents (pheromones, odors of potential prey, etc.) could be released which would strongly attract a predator, in turn dispelling potential intruders. An intelligent sheath of the present invention can posses features which offer the ability to be self-monitoring and to notify appropriate support systems when it is damaged, running low on power or materials; to communicate the type of intruder, the frequency and location of attack; and to download new instructions or program updates as needed, etc. An intelligent sheath could indicate the position of an intruder to a remote processing and response system which would react appropriately. Technological advances such as the miniaturization of machines, the availability of low power electronics including computer processors, communications equipment, and sensors; and the incorporation of energy conversion devices such as solar cells and/or batteries into the construction of a sheath of the present invention make an intelligent sheath an effective implementation of the configurable sheath apparatus. Since the sheath can be made from sheath modules or components, the modules or components can be connected or communicate with each other or with a monitoring system by a number of means (mechanical, EM, acoustical, and electrical). Thus an intelligent sheath can be networked internally and externally. An intelligent sheath can be used to provide information for analysis on-sheath or it can pre-process acquired data which is destined for a monitoring system which possesses adequate processing capabilities. An intelligent configurable sheath implementation of the invention can incorporate self-maintenance capabilities (self-cleaning, self-repair, self-monitoring) or it can notify off-sheath devices for service. An intelligent sheath may be configured with a diagnostic system which can notify a repair unit when service is needed or a repair unit may periodically inspect the sheath. Self-cleaning could involve motorized devices with brushes programmed to remove debris at set times or when a monitoring system makes a request. The need for cleaning may be reduced by coating the sheath or parts of the sheath with a non-stick material or by causing the sheath or components to undergo motion. Structures such as spikes can be made flexible so that they bend when excessive weight is applied or they could be made from an electroactive polymer material which when powered would be capable of motion. Self-repair can be accomplished using motorized repair units which can replace items such as spikes, power sources, depleted agent reservoirs, etc. An intelligent configurable sheath embodiment can include surveillance capabilities which are not limited to the immediate environment of the sheath. Extended baseline (large aperture) detector array devices can be formed by combining the data from a number of detectors distributed over an extended exposed structure such as a cable, tower or pole. For example, a large region can be under general surveillance or a smaller region can be observed from different perspectives simultaneously. An intelligent sheath can incorporate a variety of active sensor units, including pressure, thermal, magnetic, electrical, EM, acoustic, motion, and biological monitors which are distributed along the length of a sheath. For example, processed data acquired using an extended baseline array of acoustic sensors can be formed which may aid in locating a source of sound. As another example, miniature video cameras can be attached to the sheath or hub, providing multiple views of an area. FIG. 10 shows an array of hubs 105 of the present invention which are electronically networked together and to a remote processing and response system for analyzing threat detection data from an external detector 107 mounted on the structure 101. Additionally, each hub 105 may include a miniature video camera or other detector or monitor (not shown) which can be controlled remotely or automatically. A video camera could also include optional devices such as a zoom lens, switchable filters, low light level amplifiers, and an adjustable iris. Extended baseline source arrays can also be formed if desired. FIG. 8 shows a block diagram of an active component with detection and transmission capability which could be attached to a hub such shown in FIG. 10. The remote processing and response system may be used to control the viewing position of each camera as well as the amplifier, iris, and filter adjustments in addition to video processing duties. Video processing capability can also be incorporated into a sheath by integrating the capability into the camera or adding a digital signal processing component of the present invention. The remote processing and response system may be configured to also supply power or backup power. Data may be processed locally, evaluated, compressed, and transmitted off-site to a remote processing and response system for archiving, further analysis, and issuing of updated instructions. Thus the intelligent sheath apparatus design can be enhanced such that an intelligent sheath can monitor not only its own condition, but also the surrounding environment (which can be extended to include phenomena such as fires, floods, hazardous wastes or chemicals, etc. in addition to plants, animals, and machines). As mentioned, other active or passive detector units can be used with or in place of video cameras for an appropriate application. These surveillance capabilities can be used in the air, in the water, or in the ground. Signal processing capabilities can be provided either on or off the intelligent sheath depending upon the requirements of the application. Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. An apparatus for protecting an exposed structure from external threats, the apparatus comprising:
   a sheath configured to substantially encircle the exposed structure, the sheath including a plurality of spike members projecting radially out from an outermost surface of the sheath
   wherein the spike members comprise an agent dispersal means, whereupon activation of the agent dispersal means, a deterrent agent is dispensed from the agent dispersal means.

2. The apparatus of claim 1 wherein the agent dispersal means is activated by physical contact with an external threat.

3. The apparatus of claim 1 including a detector configured to detect the presence of a threat and an activator that causes activation of the agent dispersal means upon detection of a threat.

4. The apparatus of claim 3 wherein the detector is chosen from the group consisting of: a thermal detector, a pressure transducer, a proximity detector, a sound detector, a video monitoring device, a vibration detector, a motion detector, a magnetometer, an electrometer, a radiation detector, a biosensor, a spectrometer, and an electrical impulse detector.

5. The apparatus of claim 1 wherein dispersion of the deterrent agent is accomplished by pressurizing the deterrent agent.

6. An apparatus for protecting an exposed structure from external threats, the apparatus comprising:
   a sheath configured to substantially encircle the exposed structure, the sheath including at least one agent dispersal means, whereupon activation of the agent dispersal means, a deterrent agent is dispensed by the agent dispersal means.

7. The apparatus of claim 6 wherein the agent dispersal means is activated by physical contact with an external threat.

8. The apparatus of claim 6 including a detector configured to detect the presence of a threat and an activator that causes activation of the agent dispersal means upon detection of a threat.

9. The apparatus of claim 6 wherein the detector is chosen from the group consisting of: a thermal detector, a pressure transducer, a proximity detector, a sound detector, a video monitoring device, a vibration detector, a motion detector, a magnetometer, an electrometer, a radiation detector, a biosensor, a spectrometer, and an electrical impulse detector.

10. The apparatus of claim 6 wherein dispersion of the deterrent agent is accomplished by pressurizing the deterrent agent.

11. An apparatus for protecting an exposed structure from external threats, the apparatus comprising:

a sheath configured to substantially encircle the exposed structure, the sheath including at least one agent dispersal mechanism, the agent dispersal mechanism comprising a deterrent agent reservoir and an opening in fluid communication with the reservoir, whereupon activation of the agent dispersal mechanism, a deterrent agent is dispensed from the deterrent agent reservoir through the opening.

12. The apparatus of claim 11 wherein the agent dispersal mechanism is activated by physical contact with an external threat.

13. The apparatus of claim 11 including a detector configured to detect the presence of a threat and an activator that causes activation of the agent dispersal mechanism upon detection of a threat.

14. The apparatus of claim 13 wherein the detector is chosen from the group consisting of: a thermal detector, a pressure transducer, a proximity detector, a sound detector, a video monitoring device, a vibration detector, a motion detector, a magnetometer, an electrometer, a radiation detector, a biosensor, a spectrometer, and an electrical impulse detector.

15. The apparatus of claim 11 wherein dispersion of the deterrent agent is accomplished by pressurizing the deterrent agent.

* * * * *

UNITED STATES PATENT AND TRADEMARK OFFICE
CERTIFICATE OF CORRECTION

PATENT NO.     : 6,226,933 B1
DATED          : May 8, 2001
INVENTOR(S)    : Nelson et al.

It is certified that error appears in the above-identified patent and that said Letters Patent is hereby corrected as shown below:

<u>Column 2,</u>
Line 63, change "(such. as " to -- (such as --.

Signed and Sealed this

Twenty-third Day of April, 2002

Attest:

JAMES E. ROGAN
*Attesting Officer*   *Director of the United States Patent and Trademark Office*